United States Patent [19]

Osanai

[11] 4,391,416
[45] Jul. 5, 1983

[54] REEL SHAFT DEVICE OF A MAGNETIC RECORDING TAPE RUNNING APPARATUS

[75] Inventor: Akira Osanai, Hachioji, Japan

[73] Assignee: Olympus Optical Co., Ltd., Tokyo, Japan

[21] Appl. No.: 243,602

[22] Filed: Mar. 13, 1981

[30] Foreign Application Priority Data

Mar. 21, 1980 [JP] Japan ................................ 55-35826
Mar. 21, 1980 [JP] Japan ............................ 55-36990[U]
Mar. 21, 1980 [JP] Japan ............................ 55-36991[U]
Mar. 21, 1980 [JP] Japan ............................ 55-36992[U]

[51] Int. Cl.³ .......................................... B65H 17/02
[52] U.S. Cl. ................................. 242/68.1; 242/200; 192/45
[58] Field of Search ....................... 242/68.1, 200-202, 242/206, 191; 360/96.3, 96.4; 192/45, 44, 38; 188/82.84

[56] References Cited

U.S. PATENT DOCUMENTS

| | | | |
|---|---|---|---|
| 4,009,846 | 3/1977 | Coruzzi | 242/201 |
| 4,178,805 | 12/1979 | Mazzorana | 192/45 X |
| 4,317,145 | 2/1982 | Osanai | 242/200 X |

FOREIGN PATENT DOCUMENTS 347246 12/1978 Austria .
1193263 12/1962 Fed. Rep. of Germany .
1231026 3/1968 Fed. Rep. of Germany .
2295517 7/1976 France .

Primary Examiner—Johm M. Jillions
Attorney, Agent, or Firm—Frishauf, Holtz, Goodman & Woodward

[57] ABSTRACT

A reel shaft device comprises a reel hub engaging member; a rotating member capable of rotating relatively to the reel hub engaging member; a driving member having a circumferential surface facing a circumferential surface of the rotating member and capable of rotating eccentrically with the reel hub engaging member, the driving member to be rotated by a rotary power supply means; a plurality of rolling members disposed between the circumferential surfaces so as to be able to rotate; a cam member disposed on the surface of said rotating member, the cam member holding the rolling members in cooperation with the surface of the driving member to rotate the rotating member together with the driving member in one direction when the driving member rotates in the one direction, and releasing the hold of the rolling members to allow the rotating member to rotate independently of the driving member when the driving member rotates in the other direction; and a variable rotation transmitting means formed of felt and capable of variable transmitting rotation between the reel hub engaging member and the rotating member.

17 Claims, 4 Drawing Figures

REEL SHAFT DEVICE OF A MAGNETIC RECORDING TAPE RUNNING APPARATUS

BACKGROUND OF THE INVENTION

This invention relates to a reel shaft device of a magnetic recording tape running apparatus.

Generally, known is a reel shaft device which comprises a reel hub engaging member engaging a reel hub to rotate therewith, a rotating member capable of rotating relatively to the reel hub engaging member, a driving member having a circumferential surface facing a circumferential surface of the rotating member and capable of rotating concentrically with the reel hub engaging member, the driving member being rotated by a rotary power supply means, a plurality of rolling members disposed between the circumferential surface of the rotating member and the circumferential surface of the driving member so as to be able to rotate on their own axes, a cam member disposed on one of the respective circumferential surfaces of the rotating member and the driving member, the cam member holding the plurality of rolling members in cooperation with the other of the respective circumferential surfaces of the rotating member and the driving member to rotate the rotating member together wih the driving member in one direction when the driving member rotates in such one direction, and releasing the hold of the plurality of rolling members to allow the rotating member to rotate independently of the driving member when the driving member rotates in the other direction, and a variable rotation transmitting means capable of transmitting rotation between the reel hub engaging member and the rotating member, whereby the rotation transmissibility between the reel hub engaging member and the rotating member is increased substantially in inverse proportion to the decrease of the magnitude of a torque applied to the reel hub engaging member.

The reel hub engaging member and the driving member are concentrically rotatably mounted on a center shaft fixed on the chassis of the magnetic recording tape running apparatus. Further, the rotating member is concentrically rotatably mounted on the outer circumferential surface of the reel hub engaging member, and a gap with a minimum necessary size to allow the rotation of the rotating member is defined between the rotating member and the outer circumferential surface of the reel hub engaging member. Accordingly, the conventional rotating member cannot rotate as it is eccentric with respect to the outer circumferential surface of the reel hub engaging member.

With the prior art reel shaft device of such construction, if the outer circumferential surface of the reel hub engaging member is eccentric with respect to the center shaft for some reason such as manufacturing error, some of the plurality of rolling members will fail to be held by the other of the respective circumferential surfaces of the rotating member and the driving member when the driving member rotates in the one direction. If all of the rolling members are not held by the circumferential surface of the rotating member or the driving member and the cam member, the torque of the rotatory power transmitted from the driving member to the rotating member will vary, so that the reel hub engaging member and the reel hub will be subject to irregularity in rotation. Such irregularity in rotation of the reel hub will cause wow or flutter.

SUMMARY OF THE INVENTION

This invention is contrived in consideration of the aforementioned circumstances, and is intended to provide a reel shaft device of a magnetic recording tape running apparatus capable of eliminating irregular rotation of the reel hub engaging member or reel hub, and accomplishing the elimination of wow or flutter.

This invention can be more fully understood from the following detailed description when taken in conjunction with the accompanying drawings.

DETAILED DESCRIPTION

Figure 1:
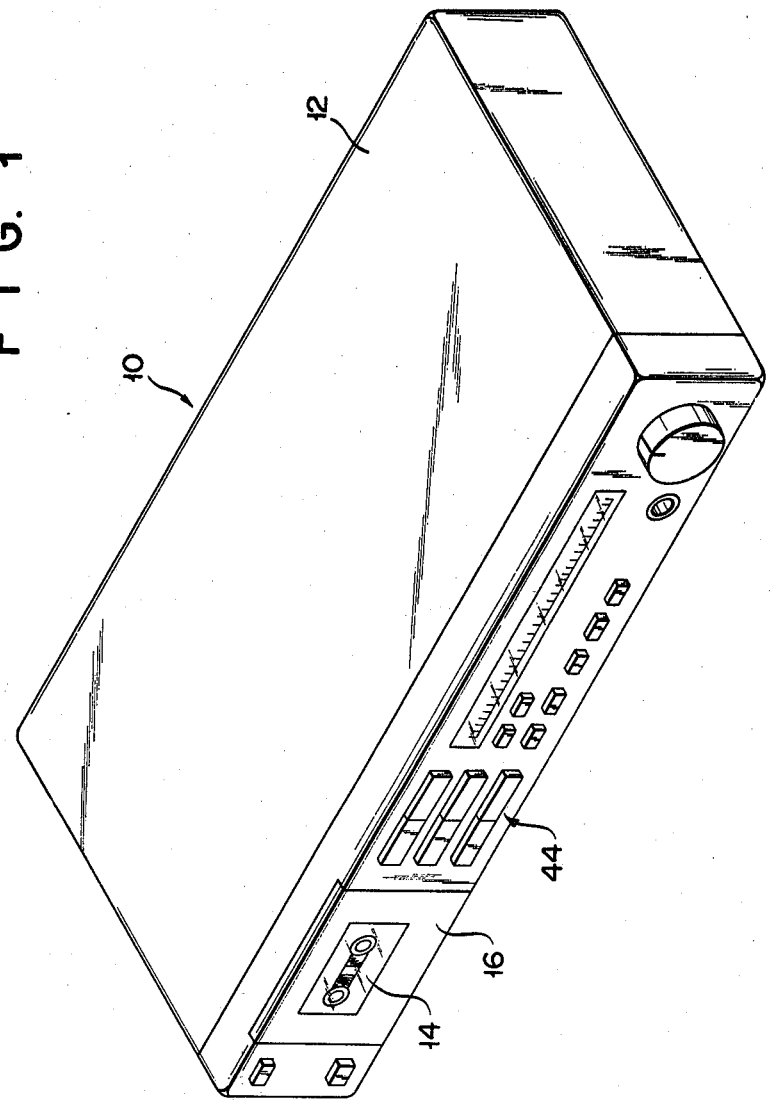
FIG. 1 is a perspective view of a magnetic recording tape running apparatus including reel shaft devices according to an embodiment of this invention.

Referring now to FIG. 1, there is shown a cassette deck 10 as a magnetic recording tape running apparatus provided with reel shaft devices according to an embodiment of this invention. The cassette deck 10 includes tape cassette mounting section 16 on the front of a housing 12, and a tape cassette 14 is removably set in the tape cassette mounting section 16. The tape cassette mounting section 16 contains therein the principal mechanism of the magnetic recording tape running apparatus as shown in FIG. 2.

Figure 2:
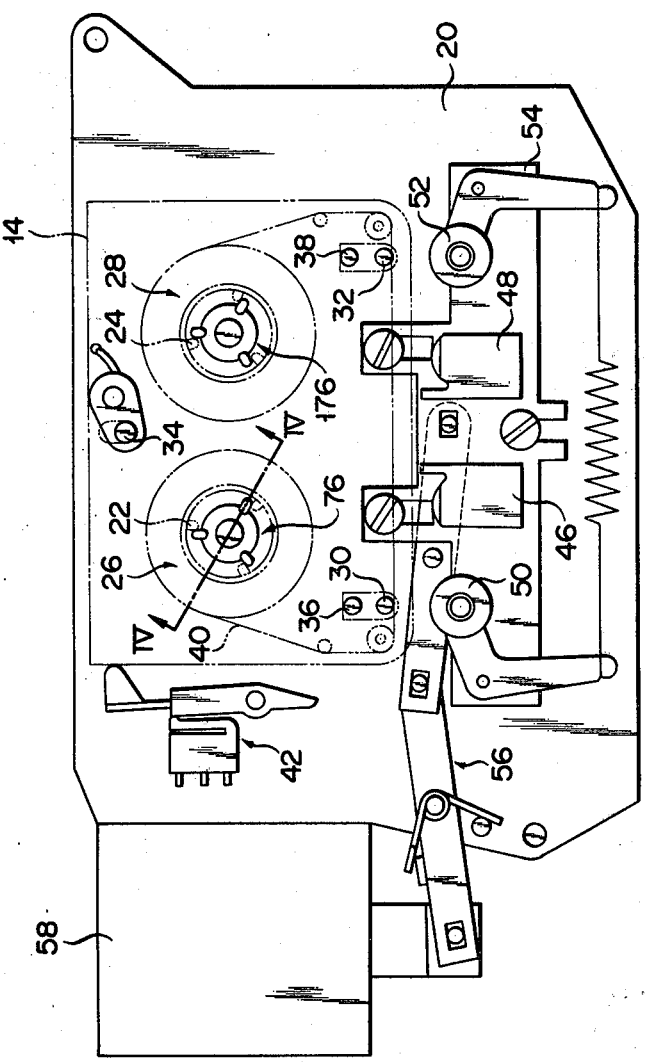
FIG. 2 is a plan view of the reel shaft devices according to an embodiment of the invention.

Referring now to FIG. 2, there are shown a pair of reel shaft devices 26 and 28 on which a pair of reel hubs 22 and 24 of the tape cassette 14 represented by two-dot chain lines are to be mounted respectively, two capstans 30 and 32, and three tape cassette locating pins 34, 36 and 38, all these members protruding from a chassis 20 of the apparatus. Mounted on the chassis 20, moreover, is an accidental erasing preventive switch 42 which abuts on removable lugs (not shown) for preventing accidental erasing of the tape cassette 14 with its reel hubs 22 and 24 mounted on the reel shaft devices 26 and 28 respectively, thereby preventing information already recorded on a magnetic recording tape 40 contained in the tape cassette 14 from being erased by accident.

On the front of the housing 12 of the cassette deck 10, as shown in FIG. 1, there are arranged a variety of control buttons 44 for recording and reproducing on and from the magnetic recording tape 40 of the tape cassette 14 set in the tape cassette mounting section 16 at the time of regular-speed feed, as well as for running the magnetic recording tape 40 in one or the other direction at various speeds for regular-speed feed, fast forward, and rewinding operations. These control buttons 44 include PLAY, RECORD, FF (FAST FORWARD), REWIND, PAUSE and STOP buttons. Mounted on the chassis 20 of the cassette deck 10, as shown in FIG. 2, is a shift plate 54 fitted with a pair of magnetic heads 46 and 48 and a pair of pinch rollers 50 and 52. The shift plate 54 can move between a first position where the magnetic heads 46 and 48 and the pinch rollers 50 and 52 are separated from the magnetic recording tape 40 of the tape cassette 14 and a second position where the magnetic heads 46 and 48 and the pinch rollers 50 and 52 are in contact with the magnetic recording tape 40. The shift plate 54 is coupled to an electric plunger 58 by means of a link mechanism 56. When the PLAY or RECORD button is depressed to establish a PLAY or RECORD mode in the cassette deck 10, the shift plate 54 is located in the second position by the action of the electric plunger 58. At this time, the pinch rollers 50 and 52 hold the magnetic recording tape 40 in cooperation with the capstans 30 and 32. When the PLAY or RECORD mode is released, the shift lever 54 is restored to the first position as shown in FIG. 2 by the action of the electric plunger 58.

Figure 3:
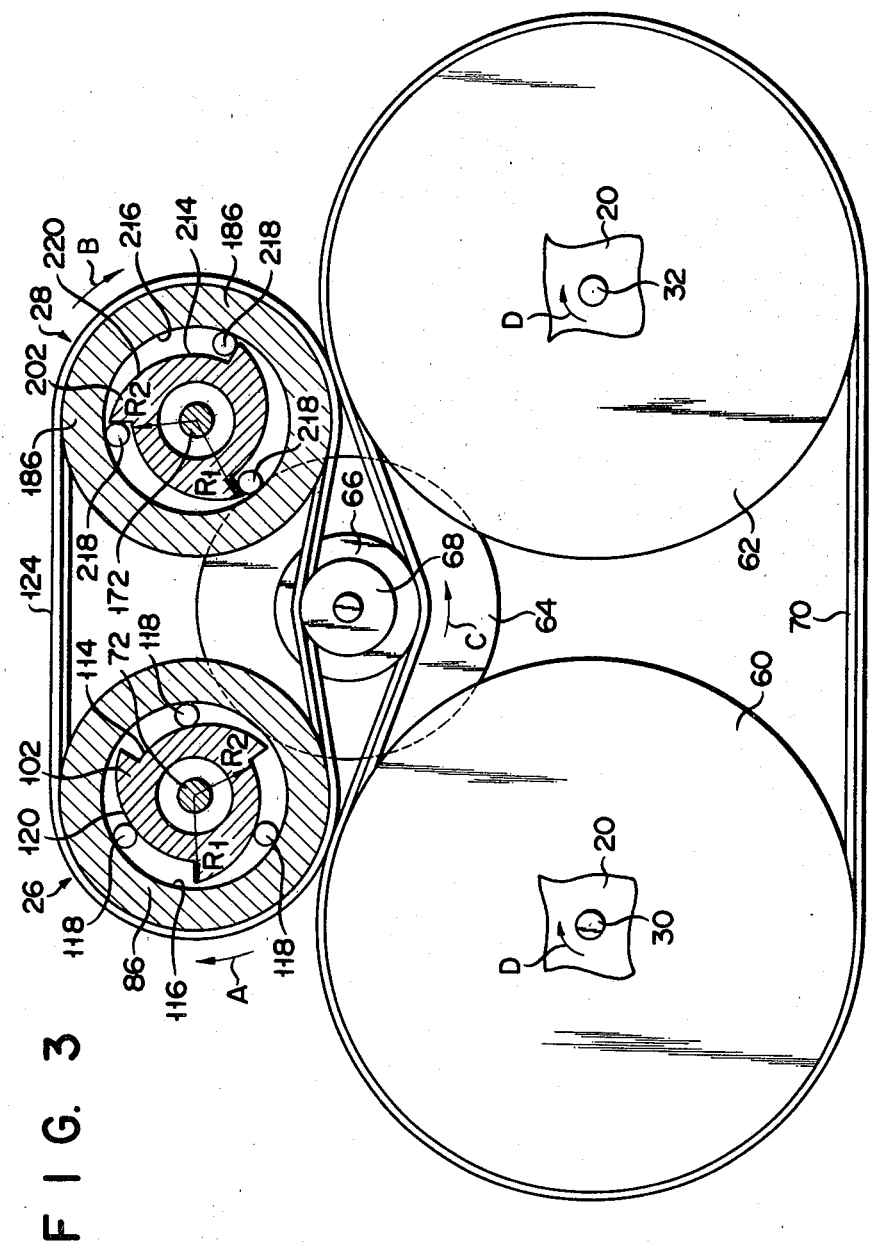
FIG. 3 is a sectional view as taken along line III—III of FIG. 4.

The capstans 30 and 32 are rotatably mounted on the chassis 20, and flywheels 60 and 62 serving also as pulleys are concentrically fixed on the capstans 30 and 32, respectively, under the chassis 20, as shown in FIG. 3. Under the chassis 20, as shown in FIG. 3, there is disposed a bidirectional DC motor 64 (hereinafter referred to as motor) as a rotary power supply means which can rotate in one and the other directions with the same characteristic without causing any trouble. The motor 64 rotates in one or the other direction at a fixed speed when the PLAY or RECORD button is depressed to establish the PLAY or RECORD mode in the cassette deck 10, and rotates in one or the other direction at a speed higher than the fixed speed when the FF or REWIND button is depressed to establish an FF or REWIND mode in the cassette deck 10. As shown in FIG. 3, a first pulley 66 and a second pulley 68 formed concentrically on the top of the first pulley 66 are fixed on the output shaft of the motor 64. A first driving belt 70 is stretched between the first pulley 66 and grooves on the outer circumferential surfaces of the pair of flywheels 60 and 62 functioning as pulleys.

Figure 4:
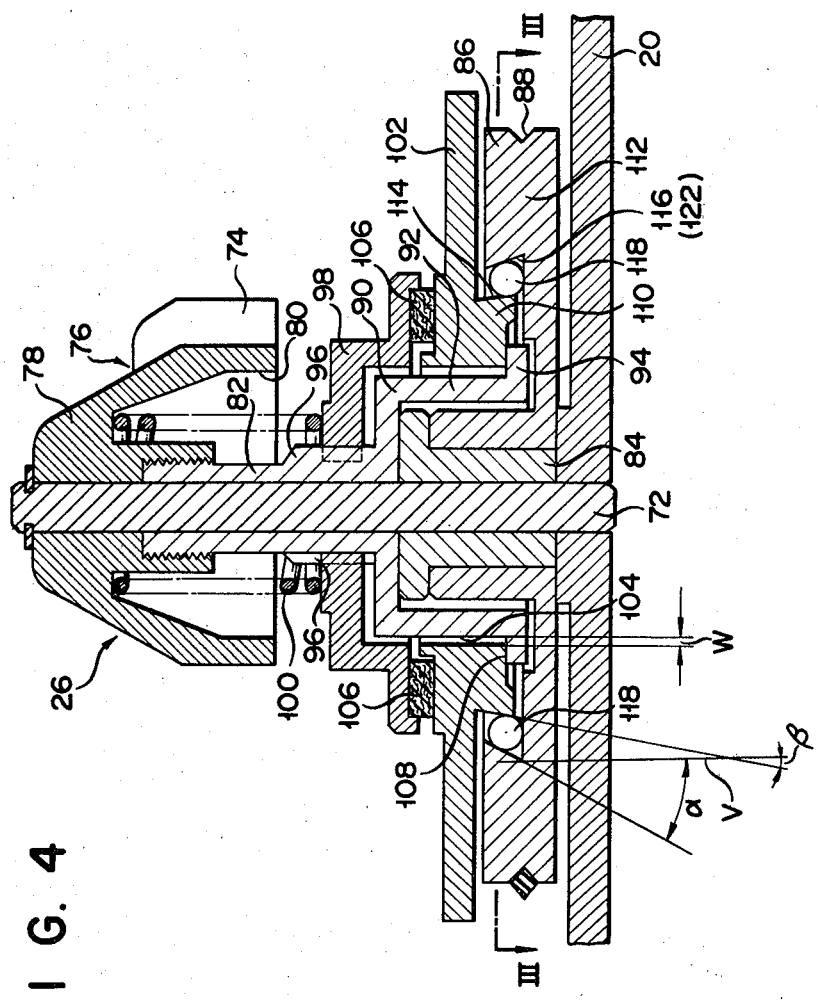
FIG. 4 is a sectional view as taken along line IV—IV of FIG. 2.

As shown in FIG. 4, the reel shaft device 26 is provided with a center shaft 72 the lower end of which is fixed to the chassis 20. Disposed at the upper end portion of the center shaft 72 is a reel hub engaging member 76 with an engaging means 74 which engages the reel hub 22 (FIG. 2) along the circumferential direction of the center shaft 72. The reel hub engaging member 76 includes an upper component 78 with its outer surface substantially in the shape of a truncated cone to facilitate the setting of the reel hub 22. The upper component 78 is concentrically rotatably mounted on the center shaft 72, and can rotate relatively to the chassis 20 in the circumferential direction of the center shaft 72. The engaging means 74, which is formed on the outer surface of the upper component 78, is a wing extending in the radial direction of the center shaft 72, in the case of this embodiment. An annular groove 80 concentric with the center shaft 72 is formed in the bottom end face of the upper component 78. Further, the reel hub engaging member 76 is provided with a substantially cylindrical lower component 82 which extends downward from the bottom end face of the upper component 78 along the circumferential surface of the center shaft 72. The lower component 82 is concentrically rotatably mounted on the center shaft 72, and can rotate relatively to the chassis 20 in the circumferential direction of the center shaft 72. The upper end of the lower component 82 is coupled with the upper component 78 by e.g. screwing, while the bottom end surface of the lower component 82 is in contact with the top end surface of a cylindrical sleeve 84 concentrically rotatably mounted on the center shaft 72 under the upper component 78, and can slide on the sleeve 84 in the circumferential direction. The bottom end surface of the sleeve 84 is in contact with the top of the chassis 20, and can slide on the upper surface of the chassis 20 in the circumferential direction of the center shaft 72. The outer circumferential surface of the sleeve 84 is fitted with a discoid driving member 86 concentric with the center shaft 72, and the driving member 86, together with the sleeve 84, can rotate relatively to the chassis 20 in the circumferential direction of the center shaft 72. The outer circumferential surface of the driving member 86 is provided with a groove 88 serving as a pulley. Formed at the lower end portion of the lower component 82 is a first flange 90 jutting out in the radial direction of the center shaft 72. A cylindrical ring 92 concentric with the center shaft 72 is formed on the under surface of the first flange 90. The lower end surface of the ring 92 is located in the vicinity of the upper end surface of the driving member 86, and is provided with a second flange 94 which juts out in the radial direction of the center shaft 72 along the upper end surface of the driving member 86. The upper end surface of the second flange 94 is finished smooth so that an object in contact therewith can slide thereon. Formed on the circumferential surface of the lower component 82 are a plurality of wings 96 jutting out in the radial direction of the center shaft 72 and extending along the shaft 72.

The upper end surface of the first flange 90 of the lower component 82 and the bottom end surface of the upper component 78 are spaced from each other along the longitudinal direction of the center shaft 72. An intermediate component 98 as a component of the reel hub engaging member 76 is disposed concentrically with the center shaft 72 between the upper end surface of the first flange 90 and the lower end surface of the upper component 78. The intermediate component 98 is in the shape of a flange jutting out in the radial direction of the center shaft 72, and can slide in the longitudinal direction of the center shaft 72 along the outer circumferential surface of the lower component 82. Further, the intermediate component 98 engages the wings 96 of the lower component 82 along the circumferential direction of the center shaft 72 to be rotated together with the lower component 82 in the circumferential direction by the wings 96. A compression coil spring 100 concentric with the center shaft 72 is disposed between the upper end surface of the intermediate component 98 and the upside bottom surface of the groove 80 of the upper component 72. The upper and lower ends of the compression coil spring 100 compressedly abut on the upside bottom surface of the groove 80 and the upper end surface of the intermediate component 98, respectively. Therefore, the intermediate component 98 is urged by the biasing force of the compression coil spring 100 to move in the downward direction of FIG. 4, that is, toward the first flange 90 of the lower component 82. The outer circumferential surface of the intermediate component 98 is located outside the outer circumferential surface of the first flange 90 of the lower component 82 as viewed along the radial direction, and a substantially discoid rotating member 102 concentric with the center shaft 72 is disposed between the under surface of the intermediate component 98 near the outer circumferential surface thereof and the upper end surface of the second flange 94 of the lower component 82. Bored in the center of the rotating member 102 is a circular hole 104 having a diameter greater than the outside diameter of the ring 92 of the lower component 82 but smaller than the outside diameter of the second flange 94. By the circular hole 104, the rotating member 102 is allowed to rotate relatively to the chassis 20 in the circumferential direction so as to be eccentric as compared with the ring 92 of the lower component 82 of the reel hub engaging member 76, that is, with the center shaft 72.

A variable rotation transmitting means 106 is disposed between the under surface of the intermediate component 98 of the reel hub engaging member 76 near the outer circumferential surface thereof and the upper end surface of the rotating member 102. In this embodiment, the variable rotation transmitting means 106 is a ring-shaped pad formed of felt. The pad is disposed concentrically with the center shaft 72, and is fixed to the under surface of the intermediate component 98 near the outer circumferential surface thereof by conventional means such as adhesives. Since the intermediate component 98 is urged downward by the biasing force of the compression coil spring 100 as mentioned before, the variable rotation transmitting means 106 is pressed against the upper end surface of the rotating member 102, and the under surface of the rotating member 102 is pressed against the upper end surface of the second flange 94 of the lower component 82 at a portion near the circular hole 104. Thus, the portion of the under surface of the rotating member 102 near the circular hole 104 forms a sliding surface 108 which engages and is in sliding contact with the upper end surface of the second flange 94 of the lower component 82 of the reel hub engaging member 76 along the longitudinal and circumferential directions of the center shaft 72, respectively.

As shown in FIG. 4, a downwardly projecting portion 110 is formed on the under surface of the rotating member 102. The projecting portion 110 is in the shape of an annulus concentric with the center shaft 72. Formed on the upper end surface of the driving member 86 is a prominent portion 112 rising upward from a portion of the driving member 86 outside the outer circumferential surface of the projection portion 110 of the rotating member 102 as viewed along the radial direction. The prominent portion 112 is in the shape of an annulus concentric with the center shaft 72. An outer circumferential surface 114 of the projecting portion 110 of the rotating member 102 and an inner circumferential surface 116 of the prominent portion 112 of the driving member 86 face each other with a space left along the radial direction. Between the outer circumferential surface 114 of the projecting portion 110 of the rotating member 102 and the inner circumferential surface 116 of the prominent portion 112 of the driving member 86, as shown in FIG. 3, three spherical rolling members 118 with a diameter a little shorter than the height of the inner circumferential surface 116 are arranged at regular intervals along the circumferential direction. Engaging the upper end surface of the driving member 86, as shown in FIG. 4, these three rolling members 118 are prevented by the upper end surface from moving downward along the central axis of the center shaft 72. The center of each rolling member 118 is flush with the sliding surface 108 of the rotating member 102.

As shown in FIG. 3, a cam member 120 is formed on the outer circumferential surface 114 of the rotating member 102.

The cam member 120 is composed of three sections of the same shape corresponding to the three rolling members 118. As shown in detail in FIG. 3, each of the three sections is in the form of a part of a spiral which spreads out while rotating clockwise around the rotating axis of the center shaft 72. The dimensions of each such section are determined as follows. In FIG. 1, a radius R1 of the rotating member 102 measured at points farthest from the rotating axis of the center shaft 72 is determined so that the radial gap between each of these points and the inner circumferential surface 116 of the driving member 86 is shorter than the diameter of the rolling member 118 even when the rotating member 102 becomes most eccentric in the opposite direction to an arrow representing the radius R1 with respect to the center shaft 72, that is, when that portion of the inner circumferential surface 116 of the rotating member 102 defining the circular hole 104 which is located on the arrow representing the radius R1 is brought in contact with the outer circumferential surface of the ring 92 of the lower component 82. On the other hand, a radius R2 of the rotating member 102 measured at points nearest to the rotating axis of the center shaft 72 determined so that the radial gap between each of such points and the inner circumferential surface 116 of the driving member 86 is greater than the diameter of the rolling member 118 even when the rotating member 102 becomes most eccentric in the direction of an arrow representing the radius R2 with respect to the center shaft 72, that is, when that portion of the inner circumferential surface 116 of the rotating member 102 defining the circular hole 104 which is located on a straight line directed opposite to the arrow representing the radius R2 is brought in contact with the outer circumferential surface of the ring 92 of the lower component 82.

Accordingly, when the driving member 86 is rotated in the direction of an arrow A of FIG. 3, the rolling members 118 slide on the inner circumferential surface 116 of the driving member 86 to move in the direction of the arrow A while rotating clockwise on their own axes. Thus, even when the rotating member 102 is most eccentric in the opposite direction to the arrow representing the radius R1 with respect to the center shaft 72, the rolling members 118 are pressed against the inner circumferential surface 116 within the same plane with the sliding surface 108 by the sections of the cam member 102 each in the form of a part of a spiral before they reach the points corresponding to the radius R1. As a result, the rolling members 118 are held by these spiral sections of the cam member 120 and the inner circumferential surface 116 of the driving member 86. By the frictional engagements between the spiral sections of the cam member 120 and the rolling members 118 and between the rolling members 118 and the inner circumferential surface 116 of the driving member 86, the rotating member 102 is rotated together with the driving member 86 in the direction of the arrow A.

When the plurality of rolling members 118 are held by the inner circumferential surface 116 of the prominent portion 112 of the driving member 86 and the cam member 120 on the outer circumferential surface 114 of the projecting portion 110 of the rotating member 102, a gap with a given width W is defined between the inner circumferential surface 116 of the rotating member 102 and the outer circumferential surface of the ring 92 of the lower component 82 of the reel hub engaging member 76 along the whole circumference, as shown in FIG. 4.

When the driving member 86 is rotated in the opposite direction to the arrow A of FIG. 3, on the other hand, the rolling members 118 slide on the inner circumferential surface 116 of the driving member 86 to move in the opposite direction to the arrow A while rotating counterclockwise on their own axes. Thus, the rolling members 118 are released from the press against the inner circumferential surface 116 to dissolve the frictional engagement, and the rolling members 118 are rotatably held between the points corresponding to the radius R2 and the inner circumferential surface 116 of the driving member 86 even when the rotating member 102 is most eccentric in the direction of the arrow representing the radius R2 with respect to the center shaft 72.

In the case of this embodiment, the inner circumferential surface 116 of the driving member 86 serves also as a displacement preventing means 122 for preventing the three rolling members 118 from moving in the upward direction of FIG. 4 along the rotating axis of the center shaft 72. That is, in FIG. 4, the inner circumferential surface 116 of the driving member 86 is a slanting surface which intersects a straight line V parallel to the rotating axis of the center shaft 72 at an angle $\alpha$. As shown in FIG. 4, the upper end portion of the slanting surface extends into the locus of movement of the three rolling members 118 along the rotating axis of the center shaft 72. In this embodiment, moreover, the outer circumferential surface 114 of the rotating member 102 is a subsidiary slanting surface which intersects the rotating axis of the center shaft 72 or the straight line V at an angle $\beta$ narrower than the angle $\alpha$, or the angle of inclination of the displacement preventing means 122, as shown in FIG. 4.

As shown in FIG. 3, the other reel shaft device 28 has the same construction as the aforementioned reel shaft device 26 except the configuration of the three sections constituting the cam member 120. As regards the construction of the reel shaft device 28, therefore, there will be described only the differences between the two reel shaft devices 26 and 28. For the ease of explanation, the components of the reel shaft device 28 are designated by reference numerals obtained by adding 100 to the reference numerals for their corresponding components of the reel shaft device 26. Detailed description of such components is omitted herein.

A cam member 220 is formed on the outer circumferential surface 216 of a rotating member 202 of the other reel shaft device 28, as shown in FIG. 3.

The cam member 220 is composed of three sections of the same shape corresponding to three rolling members 218. As shown in detail in FIG. 3, each of the three sections is in the form of a part of a spiral which spreads out while rotating counterclockwise around the rotating axis of a center shaft 172. The dimensions of each such section are the same as those which are measured at the points corresponding to the radius R1 and R2 in conjunction with the reel shaft device 26. Corresponding portions of the same radius are designated by the same reference numerals, and detailed description of such portions is omitted herein.

Accordingly, when a driving member 186 is rotated in the direction of an arrow B of FIG. 3, the rolling members 218 slide on the inner circumferential surface 216 of the driving member 186 to move in the direction of the arrow B while rotating clockwise on their own axes. Thus, even when the rotating member 202 is most eccentric in the direction of an arrow representing the radius R2 with respect to the center shaft 172, the rolling members 218 are rotatably held between the points corresponding to the radius R2 and the inner circumferential surface 216 of the driving member 186.

When the driving member 186 is rotated in the opposite direction to the arrow B of FIG. 3, on the other hand, the rolling members 218 slide on the inner circumferential surface 216 of the driving member 186 to move in the opposite direction to the arrow B while rotating counterclockwise on their own axes. Thus, even when the rotating member 202 is most eccentric in the opposite direction to the arrow representing the radius R1 with respect to the center shaft 172, the rolling members 218 are pressed against the inner circumferential surface 216 within the same plane with a sliding surface (not shown) of the reel shaft device 28 by the sections of the cam member 220 each in the form of a part of a spiral before they reach the points corresponding to the radius R1. As a result, the rolling members 218 are held by these spiral sections of the cam member 220 and the inner circumferential surface 216 of the driving member 186. By the frictional engagements between the spiral sections of the cam member 220 and the rolling members 218 and between the rolling member 218 and the inner circumferential surface 216 of the driving member 186, the rotating member 202 is rotated together with the driving member 186 in the opposite direction to the arrow B.

As shown in FIG. 3, moreover, a second driving belt 124 is stretched between the groove 88 in the circumferential surface of the driving member 86 of the reel shaft device 26, a groove (not shown) in the circumferential surface of the driving member 186 of the reel shaft device 26 of the aforementioned construction, and the second pulley 68 of the motor 64.

Now there will be described the operations of the two reel shaft devices 26 and 28.

For the ease of explanation, let it be supposed that the pair of reel hubs 22 and 24 of the tape cassette 14 are set on the paired reel shaft devices 26 and 28, as indicated by the two-dot chain lines in FIG. 2. Further, it is assumed that the one reel hub 22 engaging the one reel shaft device 26 is only fitted with one end of the magnetic recording tape 40, while the other reel hub 24 engaging the other reel shaft device 28 is fitted with the other end of the magnetic recording tape 40 and has the magnetic recording tape 40 wound thereon.

When the PLAY button among the various control buttons 44 is depressed to establish the PLAY mode in the cassette deck 10, the pinch rollers 50 and 52 and the magnetic heads 46 and 48 are moved upward from the first position as shown in FIG. 2 along the upper end surface of the chassis 20 by the electric plunger 58 to be located in the second position (not shown). In the second position, the pinch rollers 50 and 52 hold the magnetic recording tape 40 in cooperation with the capstans 30 and 32, and the magnetic heads 46 and 48 are pressed by the magnetic recording tape 40. At the same time, the motor 64 rotates in the direction of an arrow C of FIG. 3 at a fixed speed. Then, the capstans 30 and 32 are rotated by the first driving belt 70 in the direction of arrows D at one and the same fixed speed. By the second driving belt 124, moreover, the driving member 86 of the reel shaft device 26 is rotated in the direction of the arrow A at the fixed speed, and the driving member 186 of the reel shaft device 28 is rotated in the direction of the arrow B at the same fixed speed as the driving member 86 of the reel shaft device 26.

As described above, therefore, the rotating member 102 of the reel shaft device 26, together with the driving member 86, is rotated in the direction of the arrow A by the actions of the cam member 120 and the rolling members 118. At this time, the variable rotation transmitting means 106 is in frictional engagement with the rotating member 102, so that the reel hub engaging member 76 rotates together with the rotating member 102. As for the rotating member 202 of the other reel shaft device 28, it is not rotated together with the driving member 186 by the actions of the cam member 220 and the rolling members 218.

Then held by the pair of capstans 30 and 32 and the pair of pinch rollers 50 and 52, the magnetic recording tape 40 is transmitted from the other reel shaft device 28 side to the one reel shaft device 26 side at a fixed speed by the capstans 30 and 32. The magnetic recording tape 40 delivered from the capstan 30 is wound on the reel hub 22 engaging the reel hub engaging member 76 of the reel shaft device 26. As the diameter of a roll of the magnetic recording tape 40 wound on the reel hub 22 increases, the angular speed of the reel hub engaging member 76 becomes lower as compared with the angular speed of the captsan 30, so that the torque on the reel hub engaging member 76 becomes greater. Then, the variable rotation transmitting means 106 slips on the upper end surface of the rotating member 102 to a degree proportional to the increase of the torque, thereby reducing the rotation transmissibility between the rotating member 102 and the reel hub engaging member 76. Then, the reel hub engaging member 76 causes the variable rotating transmitting means 106 to slide on the upper end surface of the rotating member 102 so that it may rotate in the direction of the arrow A at a speed lower than the rotating speed of the rotating member 102 to take up the magnetic recording tape 40. On the other reel shaft device 28 side, the magnetic recording tape 40 is drawn out by the captsan 32 from the reel hub 24 mounted on the reel shaft device 28. By the actions of the cam member 220 and the rolling members 218, at this time, the rotating member 202 of the reel shaft device 28 can rotate in the direction of the arrow B independently of the rotation of the driving member 186, so that it can increase its angular speed as the diameter of a roll of the magnetic recording tape 40 wound on the reel hub 24 mounted on the other reel shaft device 28 decreases.

Subsequently, when the REWIND button among the various control buttons 44 of the cassette deck 10 is depressed to establish the REWIND mode in the cassette deck 10, the motor 64 rotates in the opposite direction to the arrow C of FIG. 3 at a higher speed than that for the PLAY mode. Then, by the second driving belt 124, the driving member 86 of the reel shaft device 26 is rotated in the opposite direction to the arrow A, while the driving member 186 of the reel shaft device 28 is rotated in the opposite direction to the arrow B. At this time, as shown in FIG. 2, the pair of pinch rollers 50 and 52 are not in contact with the pair of capstans 30 and 32, so that the magnetic recording tape 40 will not be driven by the capstans 30 and 32.

By the actions of the cam member 120 and the rolling members 118, the one reel shaft device 26 acts like the other reel shaft device 28 in the PLAY mode operation, thereby enabling the magnetic recording tape 40 to be transmitted. As for the other reel shaft device 28, it acts like the one reel shaft device 26 in the PLAY mode operation by the actions of the cam member 220 and the rolling members 218, thereby taking up the magnetic recording tape 40 from the one reel shaft device 26 side. At this time, the magnetic recording tape 40 is not driven by the capstan 32. Therefore, even though the diameter of the roll of the magnetic recording tape 40 wound on the reel hub 24 mounted on the other reel shaft device 28 increases, the torque on the reel hub engaging member 176 of the reel shaft device 28 does not increase. Accordingly, a variable rotation transmitting means (not shown) of the reel shaft device 28 keeps on maintaining the rotation transmissibility between the rotating member 202 of the reel shaft device 28 and the reel hub engaging member 176 at 100% without slipping on the upper end surface of the driving member 102, so that the reel hub engaging member 176 of the reel shaft device 28 rotates together with the rotating member 202 and the driving member 186 at the same angular speed, thereby winding the magnetic recording tape 40 on the other reel hub 24.

Now let us suppose that the magnetic recording tape running apparatus is a tape recorder, and that the tape recorder is used in various postures so that the chassis 20 may be oriented perpendicularly, obliquely, or inside out with respect to the drawing paper of FIG. 2. In this case, the state of gravity acting on the three rolling members 118 or 218 varies to change the force of inertia, so that all of these three rolling members 118 or 218 will not simultaneously be held by the spiral sections of the cam member 120 or 220 and the inner circumferential surface 116 or 216 of the driving member 86 or 186. Thereupon, the rotating member 102 rotates eccentrically with respect to the center shaft 72 until all of the three rolling members 118 or 218 are sandwiched. Even at this time, however, there is the gap with the given width W between the inner circumferential surface of the rotating member 102 defining the circular hole 104 and the outer circumferential surface of the ring 92 of the lower component 82, so that the inner circumferential surface of the rotating member 102 will never be brought in contact with the outer circumferential surface of the lower component 82. It is therefore possible to prevent irregular rotation of the reel hub engaging member 76 or 176 and the reel hub 22 or 24 which may be caused by frictional engagement between the inner circumferential surface of the rotating member 102 and the other circumferential surface of the lower component 82.

Even on the aforesaid supposition, moreover, the three rolling members 118 or 218 are caused to rotate on their own axes by the inner circumferential surface 116 or 216 of the driving member 86 or 186 so as to be held by the spiral sections of the cam member 120 or 220 and the inner circumferential surface 116 or 216.

Without regard to the posture of the magnetic recording tape running apparatus in use, therefore, the pair of reel shaft devices 26 and 28 can securely quickly perform varied operations corresponding to the various modes of the magnetic recording tape running apparatus, such as the regular-speed feed, fast winding, and stop modes.

Again, let it be supposed that all the three rolling members 118 or 218 are not simultaneously held by the spiral sections of the cam member 120 or 220 and the inner circumferential surface 116 or 216 of the driving member 86 or 186.

Thereupon, if the sliding surface 108 is located above the centers of the rolling members 118, the rotating member 102 may possibly be inclined relatively to the rotating axis of the center shaft 72 by a moment produced by the level difference between the sliding surface 108 and the centers of the rolling members 118 and a force with which the primarily sandwiched one of the three rolling members 118 is pressed against the outer circumferential surface 114 of the rotating member 102. In this case, if the rotating member 102 is inclined, then the inner circumferential surface of the rotating member 102 defining the circular hole 104 comes in sliding contact with the outer circumferential surface of the ring 92 of the lower component 82 of the reel hub engaging member 76, thereby causing irregular rotation of the reel hub engaging member 76 and the reel hub 22. In the case of this embodiment, however, the sliding surface 108 is flush with the centers of the rolling members 118, so that the aforesaid moment will not be produced if the rolling members 118 are pressed against the outer circumferential surface of the rotating member 102. Thus, the aforesaid irregular rotation can be prevented.

In the aforementioned situation, moreover, the rolling members 118 of the one reel shaft device 26 and/or the rolling members 218 of the other reel shaft device 28 move in the upward direction of FIG. 4 from a space or spaces between the spiral sections of the cam members 120 and/or 220 and the inner circumferential surfaces 116 and/or 216 of the driving members 86 and/or 186 along the center shaft 72, tending to slip out of such space(s). Such escape of the rolling members may, however, be prevented by the displacement preventing means 122 formed of the slanting surface of the reel shaft device 26 and/or a displacement preventing means (not shown) of the reel shaft device 28. Thus, the pair of reel shaft devices 26 and 28 can securely quickly perform varied operations corresponding to the various modes of the magnetic recording tape running apparatus, such as the regular-speed feed, fast winding, and stop modes, without regard to the posture of the magnetic recording tape running apparatus in use.

At the same time, the rotating member 102 moves in the upward direction of FIG. 4 by its own weight, so that the pressure of the variable rotation transmitting means 106 against the rotating member 102 varies or the upper end surface of the rotating member 102 is inclined relatively to the rotating axis of the center shaft 72 to cause the inner circumferential surface of the rotating member 102 defining the circular hole 104 to abut on the outer circumferential surface of the ring 92 of the reel hub engaging member 76, thus tending to cause irregular rotation of the reel hub engaging member 76. Since the subsidiary slanting surface or the other circumferential surface 114 of the rotating member 102 hold the rolling members 118 in cooperation with the slanting surface or the inner circumferential surface 116 of the driving member 86, however, the rotating member 102 can be prevented from moving upward or inclining.

The reel shaft device of a magnetic recording tape running apparatus comprises a reel hub engaging member to be engaged with a reel hub to rotate therewith; a rotating member capable of rotating eccentrically with respect to the reel hub engaging member; a driving member having a circumferential surface facing a circumferential surface of the rotating member and capable of rotating concentrically with the reel hub engaging member, the driving member to be rotated by a rotatory power supply means; a plurality of rolling members disposed between the circumferential surface of the rotating member and the circumferential surface of the driving member so as to be able to rotate on their own axes; a cam member disposed on one of the respective circumferential surfaces of the rotating member and the driving member, the cam member holding the plurality of rolling members in cooperation with the other of the respective circumferential surfaces of the rotating member and the driving member to rotate the rotating member together with the driving member in one direction when the driving member rotates in the one direction, and dissolving the hold of the plurality of rolling members to allow the rotating member to rotate independently of the rotation of the driving member when the driving member rotates in the other direction; and a variable rotation transmitting means capable of transmitting rotation between the reel hub engaging member and the rotating member, whereby the rotation transmissibility between the reel hub engaging member and the rotating member is increased substantially in inverse proportion to the decrease of the magnitude of a torque applied to the reel hub engaging member.

With such construction, therefore, irregular rotation of the reel hub engaging member or reel hub can be eliminated, or the elimination of wow or flutter is accomplished.

In a preferred embodiment of the invention, the circumferential surface of the rotating member is located inside the circumferential surface of the driving member along the radial direction, and the cam member is formed on the circumferential surface of the rotating member.

With such construction, even though the magnetic recording tape running apparatus is used in various postures, the rolling members 118 or 218 are caused to rotate on their own axes by the inner circumferential surface 116 or 216 of the driving member 86 or 186 so as to be held by the spiral sections of the cam member 120 or 220 and the inner circumferential surface 116 or 216. Without regard to the posture of the magnetic recording tape running apparatus in use, therefore, the pair of reel shaft devices 26 and 28 can securely quickly perform varied operation corresponding to the various modes of the magnetic recording tape running apparatus, such as the regular-speed feed, fast winding, and stop modes.

Namely, if the cam member 120 or 220 is formed on the inner circumferential surface 116 or 216 of the driving member 86 or 186, the rolling members 118 or 218 will tend to move toward the points corresponding to the maximum radius (R2) of the cam member 120 or 220 when the driving members 86 and 186 is rotated to cause the rolling members 118 or 218 to be pressed against the cam member 120 or 220 by centrifugal force. At this time, it is apprehended that there may be obtained no frictional engagement between the rolling members 118 or 218 and the driving member 86 or 186 or between the rolling members 118 or 218 and the rotating member 102 or 202. Then, it will be impossible to perform securely and quickly the varied operations corresponding to the aforesaid various modes of the magnetic recording tape running apparatus.

In the preferred embodiment of the invention, moreover, the rotating member has a sliding surface touching and in sliding contact with the reel hub engaging member along the rotating axis of the reel hub engaging member and along the circumferential direction, respectively, and the plurality of rolling members are held within the same plane with the sliding surface by the other of the circumferential surface of the rotating member and the circumferential surface of the driving member and the cam member when the driving member rotates in the one direction.

With such construction, even though the magnetic recording tape running apparatus is used in various postures, no moment will be produced when the rolling members 118 or 218 are pressed against the outer circumferential surface of the rotating member 102 or 202, and the reel hub engaging member 76 or 176 and the reel hub 22 or 24 can be protected from irregular rotation.

In the preferred embodiment of the invention, the rotating member includes a displacement preventing means disposed on the one of the circumferential surfaces of the rotating member and the circumferential surface of the driving member and extending into the locus of movement of the plurality of rolling members in a direction along the rotating axis of the reel hub, whereby the plurality of rolling members will be prevented from moving in such direction.

With such construction, even though the magnetic recording tape running apparatus is used in various postures, the rolling members 118 or 218 can be prevented from slipping out of the space between the spiral sections of the cam member 120 or 220 and the inner circumferential surface 116 or 216 of the driving member 86 or 186. Without regard to the posture of the magnetic recording tape running apparatus in use, therefore, the pair of reel shaft devices 26 and 28 can securely quickly perform varied operations corresponding to the various modes of the magnetic recording tape running apparatus, such as the regular-speed feed, fast winding, and stop modes.

In the preferred embodiment of the invention, displacement preventing means is a slanting surface formed on the one of the circumferential surface of the rotating member and the circumferential surface of the driving member.

Such construction may facilitate the manufacture of the displacement preventing means.

In the preferred embodiment of the invention, furthermore, the slanting surface is formed on the circumferential surface of the driving member, and the rotating member has on the circumferential surface thereof a subsidiary slanting surface intersecting the rotating axis at an angle narrower than the angle of inclination of the slanting surface and to be contacted with the plurality of rolling members.

With such construction, even though the magnetic recording tape running apparatus is used in various postures, the rotating member 102 can be prevented from moving upward or inclining since the subsidiary slanting surface or the other circumferential surface 114 of the rotating member 102 hold the rolling members 118 in cooperation with the slanting surface or the inner circumferential surface 116 of the driving member 86.

Although an illustrative embodiment of this invention has been described in detail herein, it is to be understood that the invention is not limited to such embodiment, and that various changes and modifications may be effected therein by one skilled in the art without departing from the scope or spirit of the invention.

For example, the variable rotation transmitting means 106 may be formed of a material to react to a line of magnetic force, such as an iron plate, which is fixed on the under surface of the outer circumferential edge of the intermediate component 98 of the reel hub engaging member 76, and is to be attracted by the magnetic force of an electromagnet mounted on the top of the rotating member 102.

Further, the number of the rolling members 118 or 218 is not limited to three, and may be two, four, five or more.

The rolling members 118 and 218 can, moreover, be of a shape other than the spherical shape. For example, they may be columnar or cylindrical.

If the rolling members 118 and 218 are columnar or cylindrical, it is necessary only that an imaginary plane on which the sliding surface 108 exists be located within the range of the height of the rolling members 118 and 218 along the rotating axis thereof.

Furthermore, the outer circumferential surfaces 114 and 214 of the rotating members 102 and 202 are not limited to the subsidiary slanting surfaces, and may alternatively be circular circumferential surfaces concentric with the central axes of the center shafts 72 and 172.

Additionally, the displacement preventing means 122 may be a flange attached to the top of the driving member 86.

What is claimed is:

1. A reel shaft device of a magnetic recording tape running apparatus comprising:
   a rotatable reel hub engaging member to be engaged with a reel hub to rotate therewith;
   a rotating member capable of rotating with respect to said reel hub engaging member, said rotating member having a circumferential surface;
   a rotatable driving member having a circumferential surface facing said circumferential surface of said rotating member and being capable of rotating concentrically with said reel hub engaging member, said driving member being adapted to be selectively rotated in either of two directions by a rotary power supply means;
   a plurality of rolling members having axes about which they are rotatable, said rolling member being disposed between said circumferential surface of said rotating member and said facing circumferential surface of said driving member so as to be rotatable about their own axes;
   a cam member disposed on one of the respective circumferential surfaces of said rotating member and said driving member, said cam member holding said plurality of rolling members in cooperation with the other of the respective circumferential surfaces of said rotating member and said driving member to rotate said rotating member together with said driving member in one direction when said driving member rotates in said one direction, and releasing said hold on said plurality of rolling members to allow said rotating member to rotate independently of said driving member when said driving member rotates in the other direction; and
   a variable rotation transmitting means for transmitting rotation between said reel hub engaging member and said rotating member such that the rotation transmissibility between said reel hub engaging member and said rotating member increases substantially in inverse proportion to a decrease of the magnitude of a torque applied to said reel hub engaging member;
   said rotating member having a sliding surface touching and in sliding contact with said reel hub engaging member along the rotating axis of said reel hub engaging member and along the circumferential direction, respectively;
   and said plurality of rolling members being held within the same plane with said sliding surface by the other of said circumferential surface of said rotating member and said circumferential surface of said driving member and said cam member when said driving member rotates in said one direction.

2. The reel shaft device of claim 1, wherein said circumferential surface of said rotating member is located inside said circumferential surface of said driving member along the radial direction; and said cam member is formed on said circumferential surface of said rotating member.

3. The reel shaft device of claim 1 or 2, wherein said rotating member is capable of rotating eccentrically with respect to said reel hub engaging member.

4. The reel shaft device of claim 3, wherein said rotating member includes a displacement preventing means disposed on said one of said circumferential surface of said rotating member and said circumferential surface of said driving member and extending into the locus of movement of said plurality of rolling members in a given direction along the rotating axis of said reel hub for preventing said plurality of rolling members from moving in said given direction.

5. The reel shaft device of claim 4, wherein said displacement preventing means comprises a slanting surface formed on said one of said circumferential surface of said rotating member and said circumferential surface of said driving member.

6. The reel shaft device of claim 5, wherein said slanting surface is formed on said circumferential surface of said driving member.

7. The reel shaft device of claim 6, wherein said rotating member has on said circumferential surface thereof a subsidiary slanting surface intersecting said rotating axis at an angle narrower than the angle of inclination of said slanting surface of said driving member and adapted to be contacted with said plurality of rolling members.

8. The reel shaft device of claim 1 or 2, wherein said rotating member includes a displacement preventing means disposed on said one of said circumferential surface of said rotating member and said circumferential surface of said driving member and extending into the locus of movement of said plurality of rolling members in a given direction along the rotating axis of said reel hub for preventing said plurality of rolling members from moving in said given direction.

9. The reel shaft device of claim 8, wherein said displacement preventing means comprises a slanting surface formed on said one of said circumferential surface of said rotating member and said circumferential surface of said driving member.

10. The reel shaft device of claim 9, wherein said slanting surface is formed on said circumferential surface of said driving member.

11. The reel shaft device of claim 10, wherein said rotating member has on said circumferential surface thereof a subsidiary slanting surface intersecting said rotating axis at an angle narrower than the angle of inclination of said slanting surface of said driving member and adapted to be contacted with said plurality of rolling members.

12. The reel shaft device of claim 1 or 2, comprising at least three of said rolling members substantially equidistantly spaced from each other.

13. The reel shaft device of claim 12, wherein said rolling members each comprise substantially rod-shaped members having a substantially circular outer periphery.

14. The reel shaft device of claim 1, wherein said rolling members each comprise substantially rod-shaped members having a substantially circular outer periphery.

15. The reel shaft device of claim 3, wherein a gap is provided between said rotating member and said hub engaging member to permit said eccentric movement therebetween.

16. The reel shaft device of claim 1, wherein said cam member is disposed on the circumferential surface of said rotating member.

17. The reel shaft device of claim 3 wherein said rotating member is concentrically arranged with respect to said reel hub engaging member with a gap therebetween for permitting said eccentric rotation of said rotating member with respect to said reel hub engaging member.

* * * * *